Feb. 9, 1937.   L. S. TWOMEY   2,070,100
FRACTIONATING TOWER
Filed Oct. 26, 1934    3 Sheets-Sheet 1

LEE S. TWOMEY
INVENTOR

ATTORNEY

Feb. 9, 1937.    L. S. TWOMEY    2,070,100
FRACTIONATING TOWER
Filed Oct. 26, 1934    3 Sheets-Sheet 2

LEE S. TWOMEY
INVENTOR

Paul W. Pritzman
ATTORNEY

Feb. 9, 1937.  L. S. TWOMEY  2,070,100
FRACTIONATING TOWER
Filed Oct. 26, 1934  3 Sheets-Sheet 3

LEE S. TWOMEY
INVENTOR

Paul W. Pritzman
ATTORNEY

Patented Feb. 9, 1937

2,070,100

UNITED STATES PATENT OFFICE 2,070,100

FRACTIONATING TOWER

Lee S. Twomey, Vista, Calif.

Application October 26, 1934, Serial No. 750,166

8 Claims. (Cl. 202—158)

The primary object of my invention is to provide means for the separation of a ternary mixture of vapors into its components in a single piece of apparatus.

A further object of my invention is to provide an apparatus for the above purpose in which a component comprising a relatively minute proportion of the total volume of mixed vapor may advantageously be separated.

A specific object of my invention is to provide means for the continuous separation of argon in a state of useful concentration from the other components of atmospheric air.

A specific object of my invention is to provide means and a method for continuously separating a stream of propane from natural or so-called casing-head gasoline and simultaneously stabilizing the residue.

The structure of the invention may best be understood with reference to the attached drawings and the following description thereof, in which Fig. 1 is an assembled view of the tower in vertical section;

Figure 1:
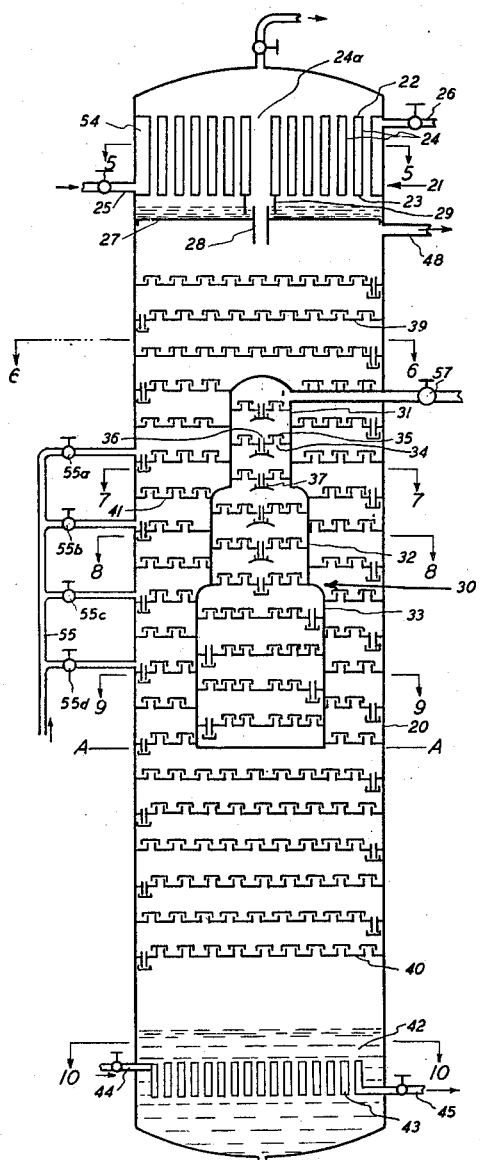
Figure 4:
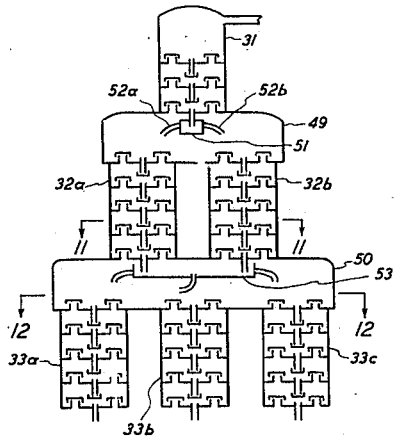
Fig. 4 is a vertical section of an alternative form of the secondary column indicated at 30 in Fig. 1.
Figure 5:
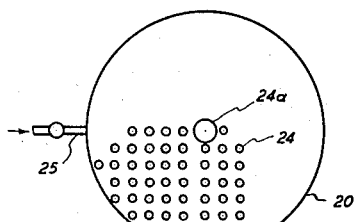
Figure 10:
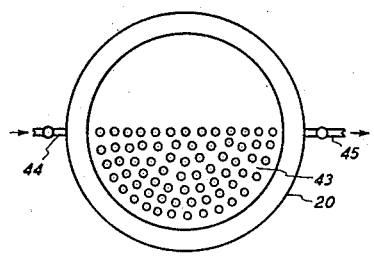
Figure 6:
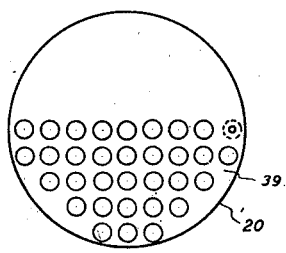
Figure 11:
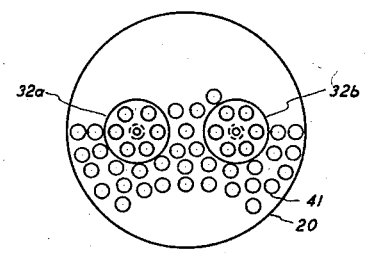
Figure 7:
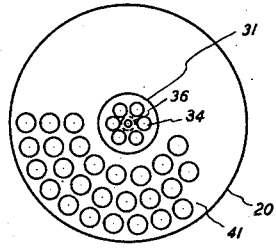
Figure 12A:
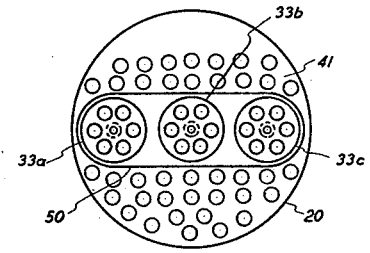
Figure 8:
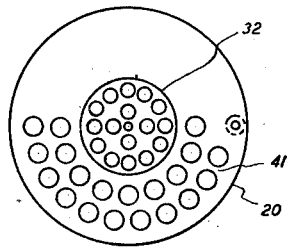
Figure 12B:
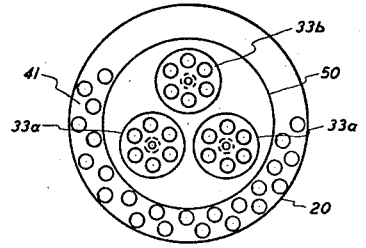
Figure 9:
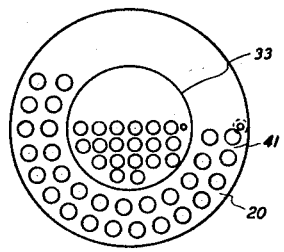
Figure 13:
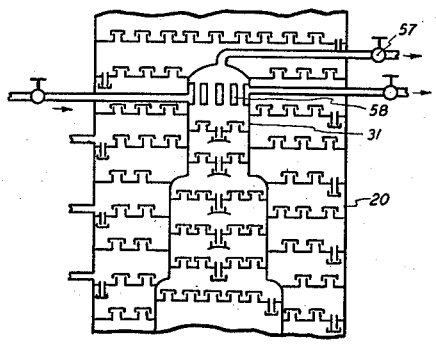
Figure 15:
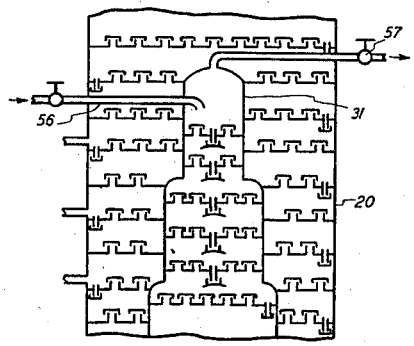
Figure 14:
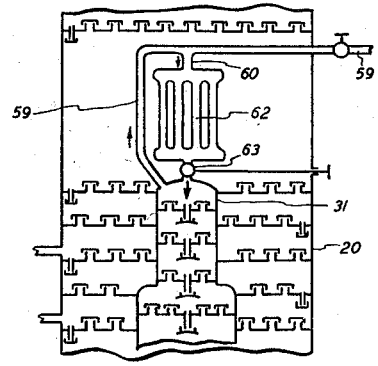

Fig. 5 is a plan section on the line 5—5 of Fig. 1;
Fig. 6 is a plan section on the line 6—6 of Fig. 1;
Fig. 7 is a plan section on the line 7—7 of Fig. 1;
Fig. 8 is a plan section on the line 8—8 of Fig. 1;
Fig. 9 is a plan section on the line 9—9 of Fig. 1;
Fig. 10 is a plan section on the line 10—10 of Fig. 1;
Fig. 11 is a plan section on the line 11—11 of Fig. 4;
Fig. 12a is a plan section on the line 12—12 of Fig. 4;
Fig. 12b is a plan section on the same line showing an alternative grouping of the elements 33a—b—c of Fig. 4;

Fig. 13 is a partial vertical section showing an internal condenser used as reflux means in the secondary column;

Fig. 14 is a partial vertical section showing an external condenser in the same use, and Fig. 15 is a partial vertical section illustrating the introduction of extraneous reflux liquid to the secondary tower.

Referring first to Fig. 1, a relatively high and narrow vertical steel shell is indicated at 20, this shell being vapor tight and being supported in any suitable manner.

In the upper end of the shell I show a refluxing condenser generally indicated at 21. This condenser consists of upper and lower tube sheets 22 and 23, made fast to the wall of shell 20, a plurality of condensing tubes 24; a central vapor tube 24a and inlet and outlet connections 25 and 26 for cooling fluid, these connections being valved or otherwise controlled; a plate or tray 27 below the tube ends arranged to collect a pool of condensate; a tube 28 projecting above this plate and acting as a dam to retain the liquid pool, the tube also functioning as a vapor passage and as a drain for downflowing liquid, and a ring 29 projected downwardly from the lower tube sheet surrounding the upper end of tube 28 and acting as a sealing means to prevent the passage of vapors into the lower ends of the condensing tubes.

This form of refluxing condenser, which is fully described and is claimed in my copending application entitled "Reboiler and condenser", filed October 26, 1934 under Serial No. 750,165, is a preferable means for cooling and controlling the temperature of the upper end of the tower, but any other refluxing condenser may be used or the temperature may be controlled by the addition of cold reflux from an outside source, as will be described.

In a medial position in the tower is placed the secondary column generally indicated at 30. This column, in the form shown in Fig. 1, consists of three (or a preferred number of) sections of cylindrical form, the diameter of each section except the top being materially greater than that of the section next above. Thus, for example, the cross sectional area of the shell of the upper section 31 may be substantially one-half the area of the next lower section 32, while the area of the lowermost section 33 may be equal to the areas of sections 31 and 32, or the relative areas may be otherwise proportioned to suit the characteristics of the materials being fractionated.

Each section of the secondary column is provided with a suitable number of fractionating plates, which are here shown as being of the well known bubble-cap type having nozzles 34 surmounted by caps 35 and each a single drain tube or downcomer 36 dipping into a sealing cup 37. In sections 31 and 32 the downcomers are shown as centrally located and in such case it is desirable to provide each sealing cap with the extension flange indicated at 38 to prevent the drainage of one plate from flowing directly into the downcomer next below. This flange is not necessary when the downcomers are located on opposite sides of the plates as shown in section 33.

Above the secondary column the tower is provided with bubble plates 39 and below the column are bubble plates 40, all provided with caps and downcomers as above described. In that portion of the height of the tower occupied by the secondary column are plates 41 which are cut away as indicated in Figs. 7, 8, and 9 to receive the inner column, to which they should be non-leakably connected and preferably in such manner as to make a heat conductive connection for the equalization of temperatures within and without the inner column.

For the control of the temperature of the lower end of the column it is often necessary to provide for reheating the condensate which collects in pool 42 and for this purpose I show a tubular heater 43 provided with valved inlet and outlet connections 44 and 45 for heating fluid.

Figure 2:
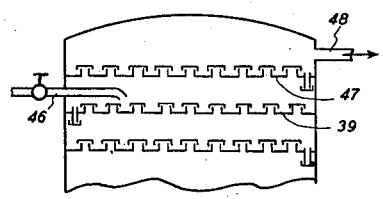
Fig. 2 is a similar section of an alternative form for the upper end of the tower.
Figure 3:
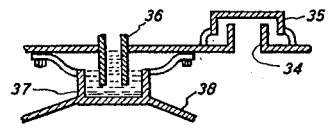
Fig. 3 is a detail of the form of vapor trap indicated at 37 in Fig. 1.

Instead of controlling the upper end temperature and providing reflux liquid by the condenser shown in Fig. 1 it may be desirable to introduce reflux liquid from an exterior source, as by means of the valved inlet pipe shown at 46 in Fig. 2. In such case it is desirable to place one or more bubble plates 47 above the level of the reflux inlet, as a means of preventing spattering and the entrainment of liquid in the vapor passing out of the tower through vapor pipe 48. In place of the bubble plate or plates indicated at 47 any known or preferred mist extracting device may be used.

The device is shown as being equipped with fractionating plates of the well known bubbling type, these being probably the most effective vapor fractionating means now known, but if desired such plates may be in part or wholly substituted by grids, broken material such as lump coke, simple perforated plates or other well known means for contacting large superficial areas of descending condensate with a column of ascending vapor.

The stepped-cone form of inner column shown in Figs. 1, 7, 8, and 9 may be substituted by the branched inner column shown in Figs. 4, 11, 12a, and 12b. Referring particularly to Fig. 4, the upper section 31 communicates at its lower end with a trunk or manifold 49 which in turn communicates with the upper ends of two parallel sections 32a and 32b. These sections communicate at their lower ends with a trunk 50 which communicates with the upper ends of three parallel sections 33a, 33b, and 33c, all of which are open at their lower ends. The condensate flowing from the lowermost plate in section 31 flows into a distributing box 51 from which it flows through the two outlets 52a and 52b which are arranged to divide it equally between the two sections 32a and 32b. In a similar manner the condensate from these sections flows into a collecting and distributing box 53 by which it is equally distributed between the three sections 33a, 33b, and 33c.

The lower sections may be arranged in a single plane as shown in plan view 12a or in a triangle as in 12b, or if the number of parallel sections be greater than three any preferred plan arrangement may be followed. It will be understood that which I have shown a sequence of one, two, and three parallel sections of equal diameter, the area of each stage of the sequence will be determined by the constitution of the material to be fractionated by the inner column, as will be explained, and that the number and individual areas of the sections in each stage, as well as the number of stages, may be varied to suit the work to be done.

As an example of the method of operating the above described apparatus, its use may be described in connection with the fractionation of casing head gasoline. This gasoline, particularly when produced by the compression method, usually contains dissolved fixed gases (methane and ethane), bodies which are gaseous at atmospheric temperatures but which are readily liquefied, such as propane and butane, and higher bodies such as pentanes and hexanes which are proper constituents of motor gasoline. It is often necessary and is customary to separate the lighter ends of such mixed gasolines by driving off the normally gaseous constituents, the propane and/or butanes being often separated as a third fraction, there being a commercial demand for propane and butane or a mixture of these bodies.

In an operation of this character a definite relation of temperatures throughout the length of the column must be maintained, according to the boiling points of the constituents to be separated. Thus, the temperature at the level of vapor outlet 29 must be the boiling point of the lightest fraction at the pressure obtaining in the column; the temperature at the top of the secondary column, at the level of vapor outlet 57, must be the boiling point of the intermediate constituent; the temperature of the liquid pool 42 must be such that the intermediate constituent is completely vaporized, and the temperature at the bottom or open end of the inner (secondary) column, indicated at A—A, must be such that the lightest constituent has been completely fractionated from the feed before reaching this level.

For example, let us assume that the column is supplied with a natural-gas gasoline which has not been stabilized and which consists of hydrocarbons ranging from ethane to pentanes and/or hexanes. To separate such a mixture into a top cut consisting solely of ethane (plus any methane which may accompany it), an intermediate cut consisting of pure propane, and a residue comprising all the higher boiling constituents, we would regulate the column as follows.

The top of the column is maintained at the boiling point of ethane at the pressure existing in the column. A convenient pressure is 11 atmospheres absolute or 147 pounds gauge, at which pressure ethane boils at 245° Kelvin (—28° C. or —18.4° F.). This temperature is easily reached, as for example by evaporating anhydrous liquid ammonia at 4 pounds gauge back pressure. The liquid ammonia may be evaporated in the space 54 surrounding the tubes 24 in the upper end of the column, as shown in Fig. 1, in which case the reflux liquid essential to the operation of the column will condense in the tubes 24 and flow back onto the top plate through the downpipe 28. If preferred, the requisite quantity of ethane may be liquefied in an extraneous condenser not shown and introduced into the column in liquid form as through pipe 46 of Fig. 2. In either manner, the introduction of liquid ethane, properly controlled as to quantity, establishes the desired temperature at the top of the column.

The feed is introduced onto a plate of the main column at a medial point in its height, as through one of the valved branches 55a—55d of a feed pipe 55. The selection of the proper level for introducing the feed will be reverted to, but for the present it suffices to say that it is somewhere along the length of the inner column 30.

The feed flowing downwardly over the plates of the main column must be completely deprived of ethane before it reaches the level A—A of the bottom of the inner column, as any ethane passing to lower plates will be carried into the inner column and contaminate the propane there separated. The reflux flowing from the plate immediately above A—A will then consist of propane and all higher-boiling constituents.

In order to recover all the propane this constituent must be completely vaporized by the time the residue flows from the lowermost plate of the main column into liquid pool 42 from which it is withdrawn. The temperature of this pool is therefore maintained above the boiling point of propane at 11 atm. absolute (305° K. or 32° C.), as for example by condensing a small amount of steam in the heating element 43. The actual temperature of the liquid in this pool will in practice be materially above the figures stated.

Under the stated conditions the feed, which should be brought in advance to the temperature of the liquid on the particular plate over which it enters, becomes progressively warmer as it flows from plate to plate, evolving a mixture of vapors consisting mainly of ethane and propane. As these vapors pass toward the colder upper end of the column, they are gradually freed from the higher boiling constituents and, if the temperature and quantity of reflux liquid be properly adjusted, only gaseous ethane, at its boiling point at column pressure, will flow from the vapor outlet 48, while a liquid free from ethane will pass to the plates below the level A—A.

Flowing toward the heated pool in counterflow to ascending vapors, this liquid is deprived of its content of propane and the vapors evolved at progressively higher temperatures pass upwardly through plates of progressively lower temperature, being thus partially deprived of the constituents heavier than propane.

A flow of vapor through outlet 57 being established by partially opening the corresponding valve, the open lower end of inner column 30 is supplied with vapor consisting of propane and heavier constituents, relatively rich in propane by reason of the fractionating effect of the plates below, and free from ethane. The upper end of the inner column being maintained at the boiling point of propane (at column pressure), the plates of the inner column complete the fractionation of this mixed vapor in the usual manner, permitting only propane vapor to pass through outlet 57 and returning all heavier constituents to pool 42, from which they are ultimately withdrawn as stabilized gasoline residue.

In the operation above described the upper end temperature of the main column is adjusted and maintained by control of the amount and temperature of the reflux liquid and the lower end temperature by control of the steam supply to heating element 43, both of these controls being balanced against the supply of feed and being capable of ready regulation within the vapor fractionating capacity of the plates.

Assuming sufficient plate area, it is easy to so control the temperature gradient within the main column as to supply to the inner column a vapor of any desired characteristics—in this instance a vapor free from ethane and containing all the propane—but even assuming sufficient plate area within the inner column, these controls do not fully provide for control of the temperature gradient therein. To state it otherwise, these controls must be utilized to fix conditions under which an ethane-free vapor is supplied to the inner column while a propane-free ethane is delivered from the upper end and a propane-free residue is delivered from the lower end of the main column. Having so utilized these controls, the temperature gradient within the main column is fixed, and if the inner column be cooled solely by heat transfer to the fluids in the outer shell, the temperature at the upper end of the inner column will be fixed by the height to which it extends in the outer column and by its heat transferring ability. Both of these factors are, of course, fixed in the design of the apparatus, and while an inner column of any given relative height and heat conductivity will effect a perfect fractionation of some one mixture at some one feed rate, the desideratum of flexibility is entirely lacking.

I therefore prefer to provide this flexibility by supplying to the upper end of the inner column an independently controllable cooling effect. This effect may consist of a feed of suitable reflux liquid (in this example, pure liquid propane) as through pipe and valve 56 of Fig. 15; or a cooling element such as that indicated at 58 of Fig. 13 and cooled by water, brine or other suitable refrigerant may be used; or the vapor pipe 59 of Fig. 14 may be branched as at 60 to supply vapor to a condenser 62 from which an externally regulated valve 63 supplies reflux condensate to the inner column. By this internal cooling, in whatever manner produced, the temperature gradient within the inner column may be made independent of the external temperature, and the inner column may even be insulated to prevent or retard heat transfer to the outside fluids and the consequent disturbance of optimum temperature relations in the outer column.

I am aware that inner columns of cylindrical form and without provision for internal or independent cooling have heretofore been used, but the results given by these columns have been far from satisfactory. I believe that I have effected major improvements, both in the provision for independent temperature control of the inner column and in providing a column having a progressively decreasing cross sectional area in the direction of vapor travel.

Regarding the latter improvement, inner columns are often or usually required to separate a relatively small proportion of vapor of lower boiling point from a large quantity of vapor of higher boiling points. In the example above given, the ethane-free feed may contain but a few percents of propane while the quantity of mixed vapor entering the lower end of the column may be a large proportion of the total feed. In such cases a column of uniform cross section becomes highly inefficient, as either the vapor velocity through the nozzles of the lower plates is so high that the liquid is blown away from the vapor jets or else the velocity through the upper plates is so low that they do only a small proportion of the work of which they are capable. Where the column is designed for some specific duty the cross sectional area of the column may be decreased in direct proportion to the reduction in vapor volume and the optimum velocity maintained throughout the height of the column, but even if the duty on the column is variable, a material reduction in cross sectional area provides for at least an amelioration of the extreme reduction in velocity incident to the use of the cylindrical form.

As regards the alternative forms shown, the step cone structure of Fig. 1 is simpler to construct and provides for the simplest and best distribution of reflux liquid over the lower plates. The branched design shown in Fig. 4 has the major advantage of providing heat transferring surface (the vertical walls of the sections) directly proportional to the plate area of each section, an advantage which is highly material when the inner column is cooled by heat transference to the external fluids but is relatively immaterial when the inner column is provided with an independent temperature control.

It will be obvious that the above example is but one of the many uses to which a column of this type can be put. In the fractionation of natural gas gasoline containing ethane a mere increase in the upper end temperature of the inner column and of the temperature at the bottom of the main column will produce a mixed propane-butane cut from the inner column and yield a gasoline bottoms having a higher initial point and lower vapor pressure. If the gasoline feed be free from ethane, the temperatures may be so controlled as to yield a propane cut from the top of the main column, a butane cut from the top of the inner column, and a butane-free residue. In fact, the apparatus and the methods of control are capable of application to any mixture of liquids susceptible to fractionation in a bubble tower.

The apparatus is also highly adaptable to the separation of argon, in a state of purity (except for the presence of minute traces of the rare gases) or in a commercially useful state of concentration, from atmospheric air. For this purpose whole liquid air, or a crude oxygen from which a material proportion of the nitrogen has been removed, is fed into the side of the outer column, which is refluxed with pure liquid nitrogen. The top end temperature is so controlled that pure nitrogen is delivered at the top vapor outlet. The temperature at level A—A is so controlled that the reflux reaching this level is wholly (or to a desired extent) freed from nitrogen. The temperature at the bottom of the main column is so controlled that the argon content is wholly evolved from the oxygen. The temperature at the top of the inner column is so controlled that the vapor evolved at outlet 57 is wholly (or to a desired extent) freed from oxygen, this control being effected either by the introduction of pure liquid argon as reflux or by the expansion of a liquefied gas (for example, nitrogen) in a cooling element in the inner column head. The separation of actually pure argon in this manner requires a relatively large plate area in the inner column, because of the slight difference in boiling points between oxygen and argon, and the capacity of any given column is greatly increased by merely concentrating the argon to an extent which renders it capable of purification by other means, as for example by combustion of the oxygen.

I claim as my invention:

1. In a fractionating column having fractionating plates: an inner column open at only its lower end and provided with plates and with an independent vapor outlet at its upper end, said inner column comprising a plurality of stages each comprising one or more independent shells, the members of shells and the total plan sectional area of successive stages decreasing in an upward direction; means for collecting the vapor leaving the upper ends of the shells of each stage except the uppermost and delivering said vapor to the lower ends of the shell or shells of the stage next above, and means for collecting the condensate leaving the lower ends of the shell or shells of each stage except the lowermost and distributing said condensate to the upper ends of the shells of the stage next below.

2. In a fractionating column having fractionating plates: an inner column in free vapor communication at only its lower end with a surrounding outer column, said inner and outer columns having independent and noncommunicating vapor outlets at their respective upper ends, said inner column being provided with means for controllably withdrawing heat from its upper end, said means being independent of heat conduction to fluids contained in the outer column.

3. Apparatus substantially as and for the purpose set forth in claim 2, in which said means for withdrawing heat comprises a condenser arranged to supply reflux liquid to the upper end of said inner column, said condenser being located within said outer column, and means for controlling the condensing effect of said condenser.

4. Apparatus substantially as and for the purpose set forth in claim 2, in which said means for withdrawing heat comprises means for introducing and controlling a supply of reflux liquid into the upper end of said inner column from a source exterior to said outer column.

5. Apparatus substantially as and for the purpose set forth in claim 2, in which said inner column is insulated to substantially prevent the passage of heat from said inner column to said outer column.

6. The method of operating a fractionating column having an outer fractionating space completely surrounding an inner fractionating space communicating at only its lower end with said outer space, which includes the step of controlling the temperature of said inner space by cooling means independent of the temperature existing in said outer space.

7. The method of operating a fractionating column having an outer fractionating space completely surrounding an inner fractionating space communicating at only its lower end with said outer space, which includes the step of controllably introducing reflux liquid into said inner space to control the temperature thereof.

8. In a fractionating column having an inner shell open at only its bottom and axially disposed within said outer shell, fractionating plates arranged throughout substantially the length of each said outer shell and said inner shell and independent vapor outlets from both said shells: means for introducing liquid from a source exterior said outer shell directly onto a plate in said outer shell medially located as regards the upper and lower ends of said inner shell.

LEE S. TWOMEY.